(12) United States Patent
Eom

(10) Patent No.: US 10,304,392 B2
(45) Date of Patent: May 28, 2019

(54) DISPLAY DEVICE

(71) Applicant: Samsung Display Co., Ltd., Yongin, Gyeonggi-Do (KR)

(72) Inventor: Cheol Hwan Eom, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 365 days.

(21) Appl. No.: 14/645,278

(22) Filed: Mar. 11, 2015

(65) Prior Publication Data

US 2015/0325167 A1  Nov. 12, 2015

(30) Foreign Application Priority Data

May 7, 2014 (KR) ................. 10-2014-0054255

(51) Int. Cl.

| G09G 3/28 | (2013.01) |
| G09G 3/34 | (2006.01) |
| G09G 3/3208 | (2016.01) |
| G02F 1/1333 | (2006.01) |
| G02F 1/1335 | (2006.01) |

(52) U.S. Cl.
CPC ..... *G09G 3/3406* (2013.01); *G02F 1/133308* (2013.01); *G02F 1/133615* (2013.01); *G09G 3/3208* (2013.01); *G02F 2001/133314* (2013.01); *G02F 2201/58* (2013.01); *G09G 2320/0626* (2013.01); *G09G 2360/145* (2013.01); *G09G 2360/148* (2013.01)

(58) Field of Classification Search
CPC .. G09G 2360/145; G02F 2001/133314; G02F 2201/58
See application file for complete search history.

(56) References Cited

U.S. PATENT DOCUMENTS

| 8,009,245 B2 * | 8/2011 | Kim | G02B 6/0068 250/200 |
| 2008/0088769 A1 * | 4/2008 | Kim | G02B 6/0068 349/61 |
| 2008/0198297 A1 * | 8/2008 | Choi | G02B 6/0031 349/65 |
| 2010/0085506 A1 * | 4/2010 | Kim | G02B 6/0083 349/61 |
| 2014/0191110 A1 * | 7/2014 | Holenarsipur | G06F 3/03 250/206 |

FOREIGN PATENT DOCUMENTS

| KR | 10-2008-0055476 A | 6/2008 |
| KR | 10-2010-0038855 A | 4/2010 |
| KR | 10-2013-0078328 A | 7/2013 |

* cited by examiner

*Primary Examiner* — Carolyn R Edwards
(74) *Attorney, Agent, or Firm* — Lewis Roca Rothgerber Christie LLP

(57) ABSTRACT

A display device is disclosed. In one aspect, the device includes a display panel including a display region and a non-display region and a housing accommodating the display panel therein. The device also includes a light sensing unit interposed between the display panel and the housing, the light sensing unit facing the display panel in the non-display region. The light sensing unit is configured to detect light that is totally reflected from the display panel and is emitted from a side of the display panel.

2 Claims, 3 Drawing Sheets

DISPLAY DEVICE

CROSS-REFERENCE TO RELATED APPLICATION

This application claims priority to and the benefit of Korean Patent Application No. 10-2014-0054255, filed on May 7, 2014, in the Korean Intellectual Property Office, the entire contents of which are incorporated herein by reference in their entirety.

BACKGROUND

Field

The described technology generally relates to a display device.

Description of the Related Technology

To serve our information-oriented society, various display technologies have been developed, for example, organic light-emitting diode (OLED), liquid crystal display (LCD), electrophoretic display (EPD), and electro-wetting display (EWD) panel have been applied to a display device.

As OLED and LCD displays are repeatedly used, the respective OLEDs and backlight unit degrade, resulting in reduced luminance and image quality.

A typical OLED or LCD display includes a compensation circuit to adapt the luminance of the OLED or the backlight unit according to usage. For example, the compensation circuit may regulate the luminance of the OLED or the backlight unit, depending on light intensity that is received by a light sensor placed on a side of the display panel.

SUMMARY OF CERTAIN INVENTIVE ASPECTS

One inventive aspect is a display device for preventing a light sensor from being undesirably moved.

Another aspect is a display device, comprising a display panel including a display region and a non-display region, a housing accommodating the display panel therein, and a light sensing portion formed between the display panel and the housing, and configured to face the display panel in the non-display region. The light sensing portion may detect light that is totally reflected from the display panel and is emitted from a side of the display panel.

The display panel may include a first substrate including a light-emitting diode in the display region and a plurality of uneven portions in the non-display region, and a second substrate facing the first substrate.

The uneven portions may be formed on a surface of the first substrate facing the light sensing portion.

The light sensing portion may include a light sensor detecting light that is emitted from the uneven pattern and is incident onto a surface parallel to the first substrate, and a sensor substrate mounting the light sensor thereon. The light sensing portion may be secured to the bottom portion.

The housing may include a bottom portion shaped to correspond to a shape of the display panel, a plurality of side portions extending from the bottom portion and bent upwards, and flanges extending from the side portions and bent to be parallel to the bottom portion.

The display device may further include a drive circuit portion interposed between the display panel and the bottom portion.

The light sensing portion may include a light sensor detecting light that is incident onto a surface parallel to the first substrate, a sensor substrate mounting the light sensor thereon, and a reflective mold coupled to a side of the display panel to support the display panel and the sensor substrate.

The reflective mold may include a substrate seating portion on which the sensor substrate is seated, a panel support portion formed on the display panel to support the display panel, and a reflecting portion connecting the substrate seating portion with the panel support portion and reflecting light emitted from a side of the display panel, thus guiding the light to the light sensor.

The reflecting portion may include at least one inclined surface.

The reflective mold may be made of an elastic material.
The display device may further include a polarizer formed on a surface of the display panel from which light is emitted.

Another aspect is a display device, comprising: a display panel including a display region and a non-display region; a housing accommodating the display panel therein; and a light sensing unit interposed between the display panel and the housing, the light sensing unit facing the display panel in the non-display region, wherein the light sensing unit is configured to detect light totally internally reflected from the display panel and emitted from a side of the display panel.

In the above device, the display panel comprises: a first substrate including a light-emitting diode (OLED) in the display region, and a plurality of uneven portions in the non-display region; and a second substrate facing the first substrate. In the above device, the width of the uneven portions is substantially similar to the width of the light sensing unit. In the above device, the uneven portions include a plurality of protrusions and recesses alternately formed with respect to each other. In the above device, each of the uneven portions has a substantially saw-tooth shape. In the above device, the uneven portions are formed on a surface of the first substrate facing the light sensing unit. In the above device, the light sensing unit comprises: a light sensor configured to detect light emitted from the uneven portions and incident onto a surface thereof substantially parallel to the first substrate; and a sensor substrate mounting the light sensor thereon.

In the above device, the housing comprises: a bottom portion shaped to correspond to a shape of the display panel; a plurality of side portions extending from the bottom portion and bent upwards; and a plurality of flanges extending from the side portions and bent to be substantially parallel to the bottom portion. The above device further comprises: a drive circuit interposed between the display panel and the bottom portion. In the above device, the light sensing unit is attached to the bottom portion. In the above device, the distance between the bottom portion and the driver circuit is substantially the same as the distance between the bottom portion and the sensor substrate, and wherein the thickness of the sensor substrate is substantially the same as the thickness of the bottom portion.

In the above device, the display panel comprises first and second substrates facing each other, and wherein the light sensing unit comprises: a light sensor configured to detect light incident onto a surface thereof substantially parallel to the first substrate; a sensor substrate mounting the light sensor thereon; and a reflective mold connected to a side of the display panel to support the display panel and the sensor substrate. In the above device, the reflective mold comprises: a substrate seating portion on which the sensor substrate is seated; a panel support portion formed on the display panel to support the display panel; and a reflecting portion connecting the substrate seating portion with the panel support portion, and configured to reflect light emitted from a side of the display panel so as to guide the light to the light sensor. In the above device, the reflecting portion comprises at least one inclined surface. In the above device, the reflective mold is formed of an elastic material. The above device further comprises: a polarizer formed on a surface of the display panel from which light is emitted. In the above device, a gap is formed between the sensing unit and the display panel.

Another aspect is a display device, comprising: a display panel including a display region and a non-display region, wherein a plurality of uneven portions are formed in the non-display region and configured to emit light; a housing accommodating the display panel therein; and at least one light sensor formed in the non-display region and configured to detect the light emitted from the uneven portions.

In the above device, the uneven portions directly face the light sensor. In the above device, each of the uneven portions has a substantially saw-tooth shape.

BRIEF DESCRIPTION OF THE DRAWINGS

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
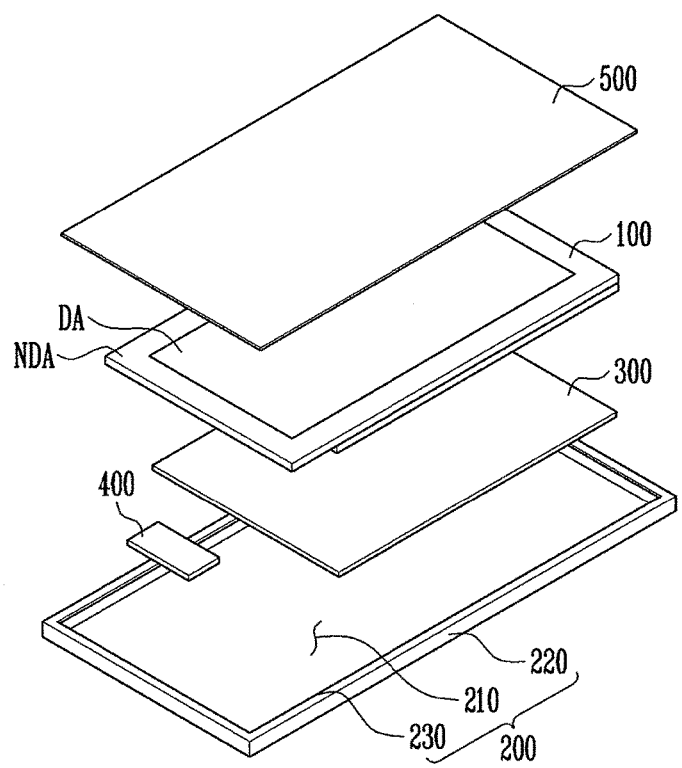
FIG. 1 is an exploded perspective view illustrating a display device according to an embodiment.

An OLED display or LCD display generally includes a light sensor which is placed on a side of the display panel to detect light that is emitted therefrom. However, the light sensor may be undesirably moved by external shocks resulting from, for example, a drop test on the display device. The undesirable movement of the light sensor may lead to a change in the amount of light sensed by the light sensor, thus inhibiting the compensation circuit from compensating for the luminance of the OLED or the backlight unit.

While embodiments are described with reference to the accompanying drawings, it is to be understood that various changes and modifications may be made in the invention without departing from the spirit and scope thereof. Further, it should be understood that the invention is not limited to the specific embodiments thereof, and various changes, equivalences and substitutions may be made without departing from the scope and spirit of the invention.

Like reference numerals designate like elements throughout the drawings. In the drawings, the dimension of elements may be exaggerated for the clarity of this invention. Although terms "first", "second", etc. are used herein to describe various elements, these elements should not be limited by these terms. These teems are only used to distinguish one element from another element. For example, the first element may be designated as the second element without departing from the scope of the invention. Similarly, the second element may be designated as the first element. Further, the singular forms "a" and "an" include plural referents unless the context clearly dictates otherwise.

Herein, it should be understood that terms "include" or "have" are inclusive of characteristics, numerals, steps, operations, elements, parts or combination thereof, but are not exclusive of one or more different characteristics, numerals, steps, operations, elements, parts or combination thereof. Further, when an element, such as a layer, a film, a region or a plate, is referred to as being "on" another element, it can be directly on the another element or be on the another element with one or more intervening elements interposed therebetween. Also, when an element, such as a layer, a film, a region or a plate, is referred to as being "under" another element, it can be right under the another element or be under the another element with one or more intervening elements interposed therebetween. In this disclosure, the term "substantially" includes the meanings of completely, almost completely or to any significant degree under some applications and in accordance with those skilled in the art. Moreover, "formed on" can also mean "formed over."

Hereinafter, embodiments will be described in detail with reference to the accompanying drawings.

Figure 2:
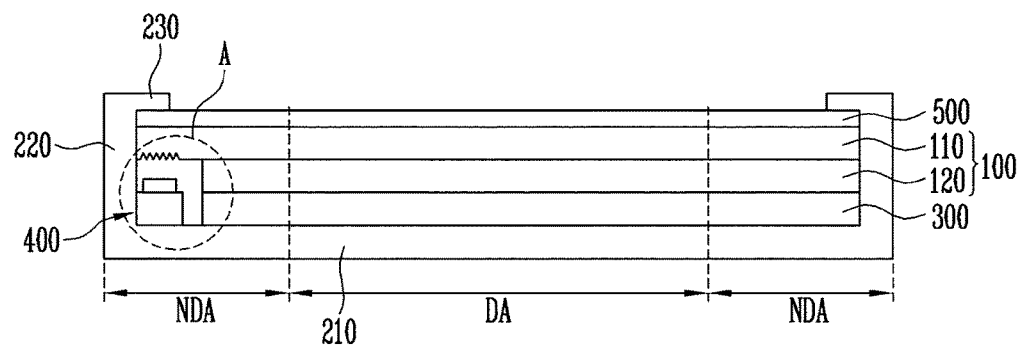
FIG. 2 is a sectional view of the display device illustrated in FIG. 1.
Figure 3:
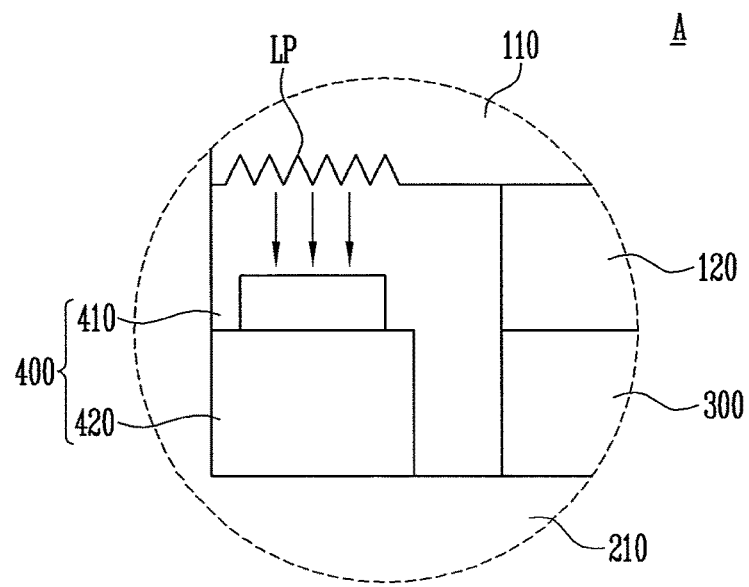
FIG. 3 is an enlarged view illustrating portion A encircled in FIG. 2.

Referring to FIGS. 1 to 3, the display device includes a display panel 100, a housing 200, a drive circuit portion 300, a light sensing portion 400, and a polarizer 500.

The display panel 100 may include a display region DA on which an image is displayed, and a non-display region NDA which surrounds the display region DA.

The display panel 100 is not limited to a specific panel. For example, it is possible to use a display panel enabling spontaneous emission such as an OLED panel as the display panel 100. Further, it is possible to use a non-emissive display panel such as an LCD panel, an EPD panel or an EWD panel, as the display panel 100. When the non-emissive display panel is used as the display panel 100, a mobile device may be provided with a backlight unit which is configured to supply light to the display panel 100. According to this embodiment, the OLED display panel is used as an example of the display panel 100.

The display panel 100 may include a first substrate 110 on which an OLED is placed, and a second substrate 120 which faces the first substrate 110.

In the display region DA, the first substrate 110 may include a thin film transistor substrate (not shown) having at least one thin film transistor formed on an insulating substrate, and the OLED electrically connected to the thin film transistor.

The OLED may be placed on the thin film transistor substrate. Further, the OLED may include a first electrode connected to the thin film transistor, an organic layer formed on the first electrode, and a second electrode formed on the organic layer. One of the first and second electrodes may be an anode electrode, while the other may be a cathode electrode. Further, at least one of the first and second electrodes may be a transmissive electrode. For example, when the OLED is a bottom emission type display, the first electrode may be a transmissive electrode and the second electrode may be a reflective electrode. Further, when the OLED is a top emission type display, the first electrode may be a reflective electrode and the second electrode may be a transmissive electrode. When the OLED is a both-side emission type display, the first and second electrodes may be transmissive electrodes. In this embodiment, the example where the OLED is a bottom reflection type display will be described.

The first electrode may be a conductive layer containing transparent conductive oxide selected out from a group consisting of indium tin oxide (ITO), indium zinc oxide (IZO), aluminum zinc oxide (AZO), gallium doped zinc oxide (GZO), zinc tin oxide (ZTO), gallium tin oxide (GTO) and fluorine doped tin oxide (FTO). The second electrode may reflect light and may contain at least one of Mo, MoW, Cr, Al, AlNd and Al alloy, which is lower in work function than the first electrode.

Further, the organic layer may include at least an emitting layer (EML), and may generally have a multi-layered thin film structure. For example, the organic layer may be provided with a hole injection layer (HIL) which is configured to inject holes, a hole transport layer (HTL) which is superior in transportability of the holes and suppresses the transfer of electrons that are not bonded to the emissive layer, thus increasing the recombination of the holes and the electrons, the emissive layer configured to emit light by the recombination of the injected electrons and holes, a hole blocking layer (HBL) configured to block the transfer of the holes that are not coupled to the emissive layer, an electron transport layer (ETL) configured to smoothly transport the electrons to the emissive layer, and an electron injection layer (EIL) configured to inject the electrons.

Although the color of light generated in the emissive layer may be one of red, green, blue and white, the present invention is not limited thereto. For example, the color of light generated in the emissive layer may be one of magenta, cyan, and yellow.

Most of the light generated in the emissive layer may be emitted to the outside through the insulating substrate. However, some of the light generated in the emissive layer may be totally reflected from the interior of the first substrate 110 and guided to a side of the first substrate 110.

In the non-display region NDA, a plurality of uneven portions LP may be formed on an outer surface of the first substrate 110, e.g., a surface facing the light sensing portion 400. The uneven portions LP may direct the totally reflected light towards the light sensing portion 400.

The second substrate 120 may isolate the OLED from an external environment, and may be joined to the first substrate 110 using a sealing substance such as a sealant. Herein, the sealing substance may be formed to the non-display region NDA. Further, the second substrate 120 may be a transparent insulating substrate. Meanwhile, if the OLED is sealed by a transparent insulating layer or the like, the second substrate 120 may be omitted.

The housing 200 may accommodate the display panel 100, the drive circuit portion 300, the light sensing portion 400, and the polarizer 500 therein. FIG. 1 illustrates the housing composed of one member that has a space for accommodating the display panel 100, the drive circuit portion 300, the light sensing portion 400, and the polarizer 500. However, the housing 200 may be configured by coupling two or more members to each other. In this embodiment, the housing 200 including the one member will be described by way of example.

The housing 200 may be made of an elastic material. Further, the housing 200 may include a bottom portion 210 that has a shape corresponding to that of the display panel 100, a plurality of side portions 220 that extend from the bottom portion 210 and are bent upwards, and flanges 230 that extend from the side portions 220 and are bent to be substantially parallel to the bottom portion 210. The bottom portion 210 and the side portions 220 may create the space for accommodating the display panel 100, the drive circuit portion 300, the light sensing portion 400, and the polarizer 500.

Further, the flanges 230 may prevent the display panel 100, the drive circuit portion 300, the light sensing portion 400, and the polarizer 500 from being dislodged from the housing 200.

The drive circuit portion 300 may be interposed between the display panel 100 and the bottom portion 210. Further, the drive circuit portion 300 may include a drive IC (not shown), a connection film (not shown) and a circuit substrate (not shown).

The drive IC may be a drive chip for driving the display panel 100, and include a gate drive IC and a data drive IC. Here, the gate drive IC may be mounted on the first substrate 110 by a chip on glass (COG) method. Further, the gate drive IC may be integrated on the first substrate 110 in the form of an amorphous silicon gate (ASG).

The connection film may include a plurality of wires that are formed on a film type substrate. The connection film causes the drive IC to be mounted on a tape carrier package (TCP) or a chip on film (COF) to be electrically connected to the first substrate 110.

The circuit substrate may be electrically connected to the first substrate 110 via the connection film, and may provide a gate signal and a data signal to the first substrate 110. The circuit substrate may be a general printed circuit board (PCB) or a flexible printed circuit board (FPCB). Herein, the circuit substrate may mount various electronic devices including a power source and a controller thereon.

The light sensing portion 400 may be provided between the display panel 100 and the bottom portion 210, and the light sensing portion may be on a side of the drive circuit portion 300. Further, the light sensing portion 400 may be received in the housing 200 to be secured to the bottom portion 210.

The light sensing portion 400 may include a light sensor 410 which detects light emitted from the display panel 100, and a sensor substrate 420 which mounts the light sensor 410 thereon.

The light sensor 410 may be a light receiving element, which may detect light that is exited from the uneven portions LP and is incident onto a surface which is parallel to the first substrate 110. The light sensor 410 may transmit a signal, which detects the light emitted from the uneven portions LP, to the drive circuit portion 300. The drive circuit portion 300 may analyze the detected signal. The drive circuit portion 300 may serve to regulate power supplied to the display unit 100, if a defective luminance is found in the display panel 100.

The sensor substrate 420 may be a printed circuit substrate, which may mount the light sensor 410 thereon. The sensor substrate 420 may transmit the signal detected by the light sensor 410 to the drive circuit portion 300. The sensor substrate 420 may be secured to the bottom portion 210, thus allowing the light sensing portion 400 to be fixed to a predetermined position. A method of securing the sensor substrate 420 to the bottom portion 210 is not limited to a specific method. For example, the sensor substrate 420 may be secured to the bottom portion 210 via an adhesive. Further, the sensor substrate 420 may be fastened to the bottom portion 210 via a screw.

The polarizer 500 may be formed on a surface of the display panel 100 from which light is emitted.

The polarizer 500 may prevent the image display performance of the display panel 100 from being deteriorated due to the reflection of external incident light (hereinafter referred to as "external light"). For example, the polarizer 500 may be provided with a polarizing film (not shown) having a polarizing axis in a specific direction, and a phase difference film (not shown) having the phase difference of ¼λ. Such a polarizer 500 converts the external light into circular polarized light, thus preventing the external light from being reflected and thereby preventing the image display performance of the display panel 100 from being lowered. In some cases, it is possible to exclude the polarizer 500.

In such a display device, the light sensing portion 400 may be fixed to the bottom portion 210 of the housing 200. Thus, although external shocks are exerted on the display device, a distance between the light sensing portion 400 and the uneven pattern LP may be kept constant.

If the distance between the light sensor 410 and the uneven pattern LP is changed by the external shocks, the luminance of light detected by the light sensor 410 may be changed even when the luminance of light exited from the uneven pattern LP is constant. The drive circuit portion regulates the power supplied to the display panel 100, using a change in luminance of light. Thus, a change in distance between the light sensor 410 and the uneven pattern LP causes the display panel 100 to display an image not with luminance optimal for a viewer but with corrected luminance. Therefore, the viewer may feel inconvenience when watching the display panel.

Hereinafter, another embodiment will be described with reference to FIGS. 4 to 6. Elements common to the embodiment of FIGS. 1 to 3 and the embodiment of FIGS. 4 to 6 will carry the same reference numerals, and a detailed description thereof will be omitted herein. In order to avoid a duplicated description, elements of FIGS. 4 to 6 which are different from those of FIGS. 1 to 3 will be mainly described.

Figure 4:
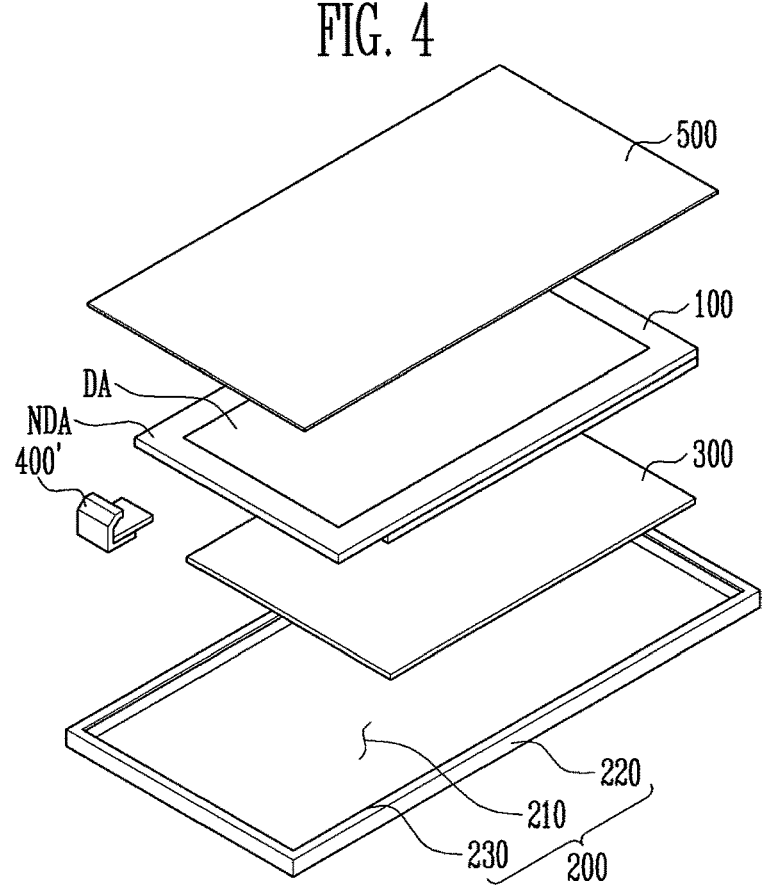
FIG. 4 is an exploded perspective view illustrating a display device according to another embodiment.
Figure 5:
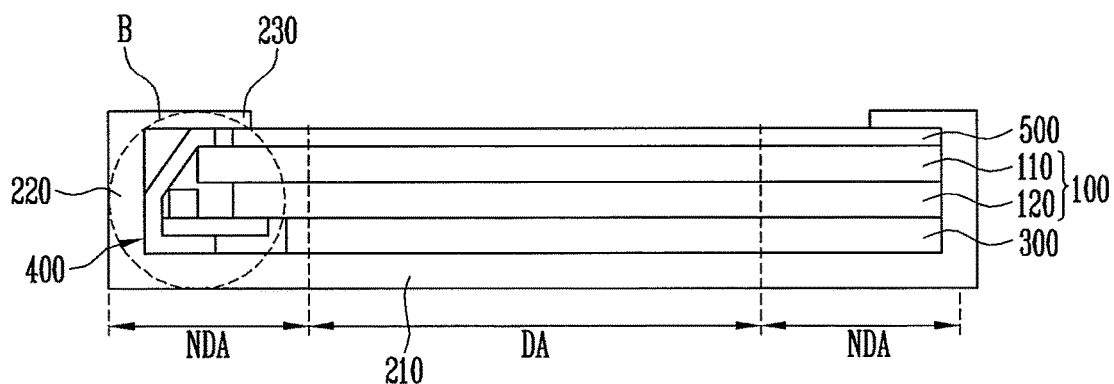
FIG. 5 is a sectional view of the display device illustrated in FIG. 4.
Figure 6:
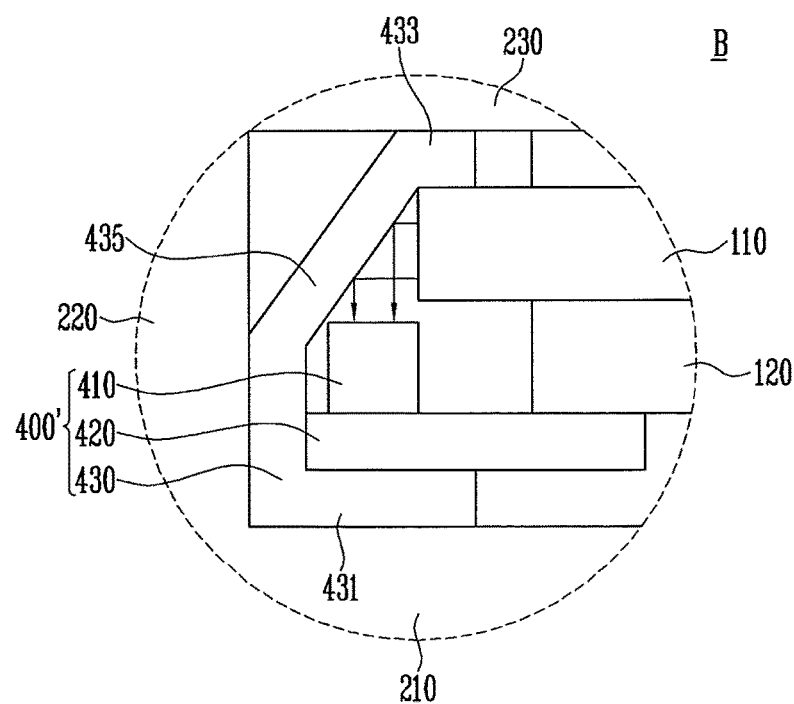
FIG. 6 is an enlarged view illustrating portion B encircled in FIG. 5.

Referring to FIGS. 4 to 6, the display device includes a display panel 100, a housing 200, a drive circuit portion 300, a light sensing portion 400', and a polarizer 500.

The display panel 100 may include a display region DA on which an image is displayed, and a non-display region NDA which surrounds the display region DA.

The housing 200 may accommodate the display panel 100, the drive circuit portion 300, the light sensing portion 400', and the polarizer 500.

The housing 200 may include a bottom portion 210 that has a shape corresponding to that of the display panel 100, a plurality of side portions 220 that extend from the bottom portion 210 and then are bent upwards, and a flange 230 that extends from the side portions 220 and is bent to be parallel to the bottom portion 210.

The drive circuit portion 300 may be interposed between the display panel 100 and the bottom portion 210.

The light sensing portion 400' may be coupled to a side of the display panel 100. For example, the light sensing portion 400' may be coupled to a side of the display panel 100 in a clip form.

The light sensing portion 400' may include a light sensor 410 which detects light emitted from the display panel 100, a sensor substrate 420 on which the light sensor 410 is mounted, and a reflective mold 430 which guides the light, emitted from the display panel 100, to the light sensor 410.

The light sensor 410 may detect light emitted from the uneven pattern LP which is provided on a side of the display panel 100. The light emitted from the uneven pattern LP is some of the light generated in the organic layer, which is not emitted to the display region DA but is transmitted to a side of the display panel 100 by total reflection.

The light sensor 410 may transmit a signal, detecting the light emitted from the uneven pattern LP, to the drive circuit portion 300. The drive circuit portion 300 may analyze the detected signal, and then regulates power supplied to the display panel 100 if defective luminance is found in the display panel 100.

The sensor substrate 420 may mount the light sensor 410 thereon, thus transmitting a signal detected by the light sensor 410 to the drive circuit portion 300.

The reflective mold 430 may have a clip form. Further, the reflective mold 430 includes a substrate seating portion 431 on which the sensor substrate 420 is seated, a panel support portion 433 which is formed on the display panel 100, and a reflecting portion 435 which connects the substrate seating portion 431 with the panel support portion 433, reflects light emitted from the display panel 100 and guides the light to the light sensor 410.

The substrate seating portion 431 and the panel support portion 433 may be substantially parallel to the display panel 100. Further, the panel support portion 433 may support the display panel 100.

The reflecting portion 435 may include at least one inclined surface. FIGS. 4 to 6 illustrate an example where the reflecting portion 435 includes one inclined surface. However, the reflecting portion 435 may include a plurality of inclined surfaces. As such, the number of inclined surfaces included in the reflecting portion 435 may vary if necessary.

Further, the reflective mold 430 may contain a light reflecting substance, and may be made of an elastic material. Thus, the reflective mold 430 renders the light sensing portion 400' to be coupled and secured to the display panel 100. Thereby, even if there occur external shocks, the path length of the light which is emitted from the display panel 100 and then is incident onto the light sensor 410 may be kept constant.

The polarizer 500 may be formed on a surface of the display panel 100 from which light is emitted.

By way of summation and review, a display device allows the path length of light, which is emitted from a display panel and then is incident onto a light sensor, to be kept constant. Therefore, it is possible to prevent the path length of the light that is incident onto the light sensor from being changed by external shocks or the like.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A display device, comprising:
a display panel including a display region and a non-display region;
a housing accommodating the display panel therein; and a light sensing unit interposed between the display panel and the housing, the light sensing unit facing the display panel in the non-display region, wherein the light sensing unit is configured to detect light totally internally reflected from the display panel and emitted from a side of the display panel, wherein the display panel comprises first and second substrates facing each other, and wherein the light sensing unit comprises:

a light sensor configured to detect light incident onto a surface thereof substantially parallel to the first substrate;

a sensor substrate mounting the light sensor thereon; and a reflective mold connected to a side of the display panel to support the display panel and the sensor substrate, wherein the reflective mold comprises:

a substrate seating portion on which the sensor substrate is seated;

a panel support portion formed on the display panel to support the display panel; and a reflecting portion connecting the substrate seating portion with the panel support portion, and configured to reflect light emitted from a side of the display panel so as to guide the light to the light sensor, wherein the reflecting portion comprises at least one inclined surface with respect to the side of the display panel, and wherein the at least one inclined surface of the reflecting portion overlaps the light sensor.

2. The device as claimed in claim 1, wherein the reflective mold is formed of an elastic material.

* * * * *